(12) United States Patent
Fukushima et al.

(10) Patent No.: US 12,483,053 B2
(45) Date of Patent: Nov. 25, 2025

(54) CONTROL DEVICE FOR ENERGY STORAGE CELL, ENERGY STORAGE APPARATUS, AND METHOD OF CONTROLLING ENERGY STORAGE APPARATUS

(71) Applicant: GS Yuasa International Ltd., Kyoto (JP)

(72) Inventors: Atsushi Fukushima, Kyoto (JP); Shigeki Hattori, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 63 days.

(21) Appl. No.: 18/561,650

(22) PCT Filed: Apr. 13, 2022

(86) PCT No.: PCT/JP2022/017669
§ 371 (c)(1),
(2) Date: Nov. 16, 2023

(87) PCT Pub. No.: WO2022/244560
PCT Pub. Date: Nov. 24, 2022

(65) Prior Publication Data
US 2024/0235232 A1    Jul. 11, 2024

(30) Foreign Application Priority Data

May 17, 2021    (JP) .................................. 2021-083126

(51) Int. Cl.
*H02J 7/00*    (2006.01)
*B60R 16/033*    (2006.01)
*H01M 10/42*    (2006.01)

(52) U.S. Cl.
CPC .......... *H02J 7/0063* (2013.01); *B60R 16/033* (2013.01); *H01M 10/425* (2013.01); *H01M 2010/4271* (2013.01)

(58) Field of Classification Search
CPC ...................................................... H02J 7/0063
(Continued)

(56) References Cited

U.S. PATENT DOCUMENTS 4,272,806 A * 6/1981 Metzger ............ H02M 3/33507
363/21.17
5,710,505 A * 1/1998 Patino ............... H02J 7/007182
320/152

(Continued)

FOREIGN PATENT DOCUMENTS

JP    2000-333375 A    11/2000
JP    2009-220601 A    10/2009

(Continued)

OTHER PUBLICATIONS

International Search Report and Written Opinion for International Application No. PCT/JP2022/017669, dated Jun. 21, 2022, (9 pages), Japan Patent Office, Tokyo, Japan.

*Primary Examiner* — Joseph Chang
(74) *Attorney, Agent, or Firm* — Buchalter, a Professional Corporation

(57) ABSTRACT

A control device 130 for an energy storage cell mounted on a vehicle, wherein the energy storage cell 62 includes, with respect to battery performance, a first region and a second region having the lower battery performance than the first region, and the control device 130, in a case where the energy storage cell 62 is shifted from the first region A1 to the second region A2, outputs a signal notifying shifting of the region A to a vehicle control unit 140 that controls the vehicle 10, and after outputting of the signal, the control device 130 maintains a current interruption device 53 that (Continued)

interrupts a current to the energy storage cell 62 in a closed state at least for a predetermined time Tw, thus enabling supply of electricity to the vehicle 10.

16 Claims, 13 Drawing Sheets

(58) Field of Classification Search
USPC .................................................. 307/10.7
See application file for complete search history.

(56) References Cited

U.S. PATENT DOCUMENTS

| | | | |
|---|---|---|---|
| 6,181,101 B1 | 1/2001 | Arai et al. | |
| 8,248,030 B2* | 8/2012 | Doepke | H02J 7/0016 |
| | | | 320/120 |
| 2012/0242144 A1* | 9/2012 | Chorian | H01M 50/583 |
| | | | 429/62 |
| 2014/0217934 A1* | 8/2014 | Suzuki | H02P 7/285 |
| | | | 318/434 |
| 2015/0357680 A1* | 12/2015 | Erlbacher | B60L 58/18 |
| | | | 257/653 |
| 2016/0336626 A1 | 11/2016 | Kawauchi et al. | |
| 2019/0386350 A1 | 12/2019 | Sato | |
| 2022/0026503 A1* | 1/2022 | Friese | H02J 7/0031 |
| 2022/0048391 A1 | 2/2022 | Shiraishi | |

FOREIGN PATENT DOCUMENTS

| | | |
|---|---|---|
| JP | 2011-176939 A | 9/2011 |
| JP | 2014-022282 A | 2/2014 |
| JP | 2017-005985 A | 1/2017 |
| JP | 2017-218090 A | 12/2017 |
| JP | 2018-148726 A | 9/2018 |
| JP | 2020-167767 A | 10/2020 |
| WO | WO-2020-059732 | 3/2020 |

* cited by examiner

Fig. 9

Data table at battery temperature Ta

| Total voltage | Current | | | |
|---|---|---|---|---|
| | Ia | Ib | Ic | Id |
| Va | Tw1 | Tw5 | Tw9 | Tw13 |
| Vb | Tw2 | Tw6 | Tw10 | Tw14 |
| Vc | Tw3 | Tw7 | Tw11 | Tw15 |
| Vd | Tw4 | Tw8 | Tw12 | Tw16 |

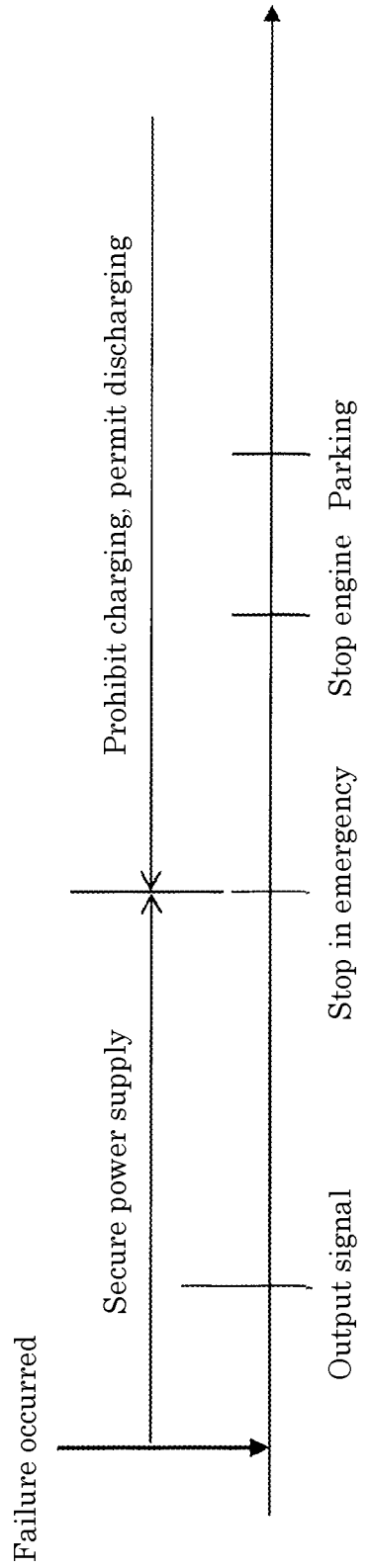

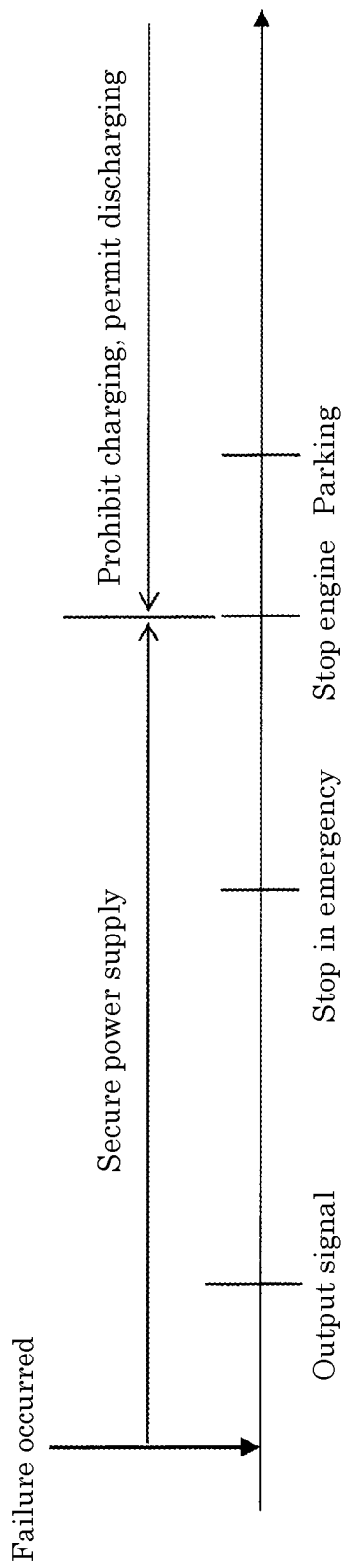

CONTROL DEVICE FOR ENERGY STORAGE CELL, ENERGY STORAGE APPARATUS, AND METHOD OF CONTROLLING ENERGY STORAGE APPARATUS

CROSS REFERENCE TO RELATED APPLICATIONS

This application is a National Stage Application, filed under 35 U.S.C. § 371, of International Application No. PCT/JP2022/017669, filed Apr. 13, 2022, which international application claims priority to and the benefit of Japanese Application No. JP2021-083126, filed May 17, 2021; the contents of both of which are hereby incorporated by reference in their entirety.

BACKGROUND

Technical Field

The present invention relates to a technique for securing safety of a vehicle by suppressing a loss of power supply.

Description of Related Art

A battery mounted on a moving body such as an automobile has a current interruption device as one of protective devices. When abnormality is detected in the battery, a current is interrupted by opening the current interruption device thus protecting the battery (Patent Document JP-A-2017-5985).

BRIEF SUMMARY

Sometimes, an energy storage cell has: a first region; and a second region that exhibits a lower battery performance than the first region. If a current interruption device is immediately opened so as to interrupt a current when the energy storage cell is shifted from the first region to the second region, the vehicle may lose a power supply.

According to an aspect of the present invention, after an energy storage cell is shifted from a first region to a second region, a current interruption device is closed at least for a predetermined time thus securing safety of a vehicle by preventing a power loss.

An energy storage cell includes, with respect to battery performance, a first region and a second region having lower battery performance than the first region. A control device of the energy storage cell, in a case where the energy storage cell is shifted from the first region to the second region, outputs a signal notifying shifting of the region to a vehicle control unit that controls a vehicle, and after outputting the signal, the control device maintains a current interruption device that interrupts a current to the energy storage cell in a closed state at least for a predetermined time, thus enabling supply of electricity to the vehicle.

The present technique is also applicable to a method of controlling the energy storage cell (or an energy storage apparatus), and a control program of the energy storage cell (or the energy storage apparatus).

The present technique ensures the safety of a vehicle by suppressing a loss of power supply.

BRIEF DESCRIPTION OF THE FIGURES

FIG. 9 is a data table.
FIG. 14A is a diagram illustrating a prohibition timing of charging electricity after the occurrence of a failure.
FIG. 14B is a diagram illustrating a prohibition timing of charging electricity after the occurrence of a failure.

DETAILED DESCRIPTION OF VARIOUS EMBODIMENTS

Figure 1:
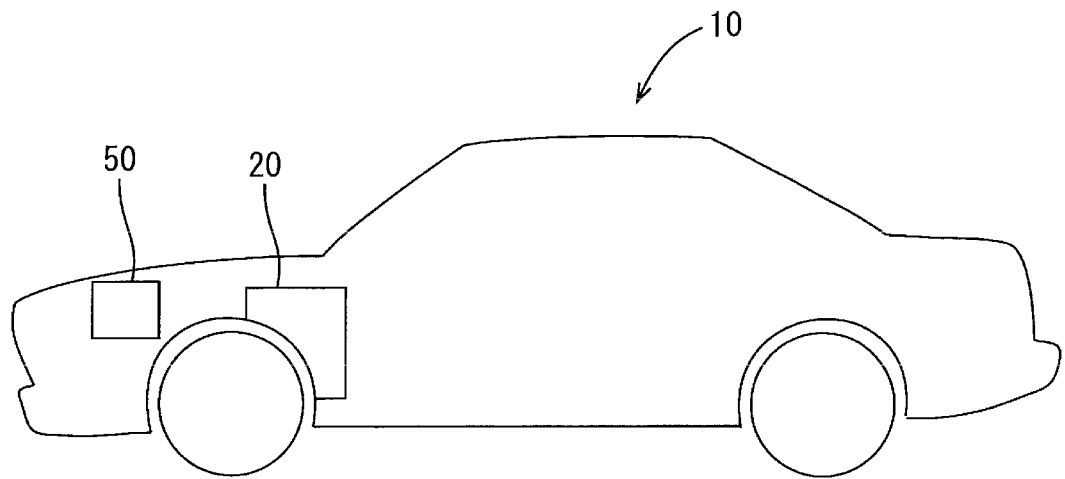
FIG. 1 is a side view of a vehicle.

An overall configuration of a control device for an energy storage cell mounted on a vehicle will be described.

An energy storage cell includes, with respect to battery performance, a first region and a second region having lower battery performance than the first region. The control device, in a case where the energy storage cell is shifted from the first region to the second region, outputs a signal notifying shifting of the region to a vehicle control unit that controls a vehicle, and after outputting the signal, the control device maintains a current interruption device that interrupts a current to the energy storage cell in a closed state at least for a predetermined time, thus enabling supply of electricity to the vehicle.

With such a configuration, when the energy storage cell is shifted from the first region to the second region, the control device outputs a signal notifying shifting of the region to the vehicle control unit that controls the vehicle. After outputting the signal, the control device does not switch the current interruption device from a closed state to an open state, and maintains the current interruption device in the closed state for a predetermined time.

With such a configuration, it is possible to maintain the power supply of the vehicle for a predetermined time after outputting of the signal. In a case where the vehicle is traveling, the driver can take safety measure such as an emergency stop of the vehicle at a safe place. Accordingly, the safety of the vehicle can be also secured. In a case where the vehicle is not traveling, it is possible to secure supply of electricity for performing a vehicle control required when a driver leaves the vehicle, such as a window opening/closing control or a door locking control, by maintaining the current interruption device in a closed state.

The energy storage cell may include, in addition to the first region and the second region, a third region where the battery performance is further lower than the battery performance in the second region, and the control device may open the current interruption device so as to interrupt a current when the energy storage cell is shifted from the second region to the third region after the outputting of the signal.

With such a configuration, when the energy storage cell is shifted from the second region to the third region after outputting of the signal, the current interruption device is opened so as to interrupt a current. By interrupting the current, the use of the energy storage cell in the third region can be prevented.

The predetermined time may be changed based on at least one of a voltage, a current, and a temperature of the energy storage cell at a stage of shifting from the first region to the second region. The progress of the deterioration of the battery performance of the energy storage cell and time required for shifting of the energy storage cell between the regions depend on a voltage, a current, and a temperature. For example, when it is expected that a current is small so that the time required for the shifting between the regions is long, the predetermined time is prolonged. In this manner, it is possible to perform time setting corresponding to the state of the energy storage cell at a point of time that the energy storage cell is shifted between the regions.

Charging of electricity to the energy storage cell after the vehicle is stopped or after an engine is stopped may be prohibited. By prohibiting charging of electricity after the vehicle is stopped or the engine is stopped, it is possible to suppress shifting of the energy storage cell to the third region.

Discharging of electricity from the energy storage cell after the vehicle is stopped may be permitted irrelevant to the lapse of the predetermined time. Since discharging of electricity after the vehicle is stopped is permitted, an SOC of the energy storage cell is lowered. At the time of exchanging the energy storage cell after the vehicle is stopped, the energy storage cell can be removed from the vehicle in a state where the SOC is lowered. Accordingly, the safety of an operation can be secured. By issuing an emergency signal (a signal for turning on a hazard lamp or the like) using, for example, the energy storage cell as a power supply in response to the permission of discharging of electricity after the vehicle is stopped, it is possible to notify to the outside that the vehicle is in an emergency stop.

In a case where the vehicle on which the energy storage cell is mounted is traveling, the current interruption device may be held in a closed state for at least the predetermined time after the energy storage cell is shifted from the first region to the second region. On the other hand, in a case where the vehicle on which the energy storage cell is mounted is not traveling, the current interruption device may be switched from the closed state to an open state at a stage where the energy storage cell is shifted from the first region to the second region.

With such a configuration, a connection state of the current interruption device is switched depending on whether the vehicle on which the energy storage cell is mounted is traveling or not traveling. Accordingly, it is possible to minimize the use of the energy storage cell in the second region while securing the safety of the vehicle. That is, in the case where the vehicle is traveling, the safety of the vehicle is secured by closing the current interruption device thus maintaining the power supply for a predetermined time after the energy storage cell is shifted from the first region to the second region. In a case where the vehicle is not traveling, after the energy storage cell is shifted from the first region to the second region, by opening the current interruption device thus interrupting the current, the use of the energy storage cell in the second region can be minimized.

When the energy storage cell is shifted from the first region to the second region in a state where the energy storage cell is not mounted on the vehicle, the current interruption device may be switched from a closed state to an open state at a stage where the energy storage cell is shifted from the first region to the second region. In the case where the energy storage cell is not mounted on the vehicle, in the same manner as the case where the vehicle is not traveling, the necessity of maintaining the power supply is small. By opening the current interruption device thus interrupting the supply of a current, the use of the energy storage cell that is not mounted on the vehicle in the second region can be minimized.

First Embodiment

1. Description of Battery 50

Figure 2:
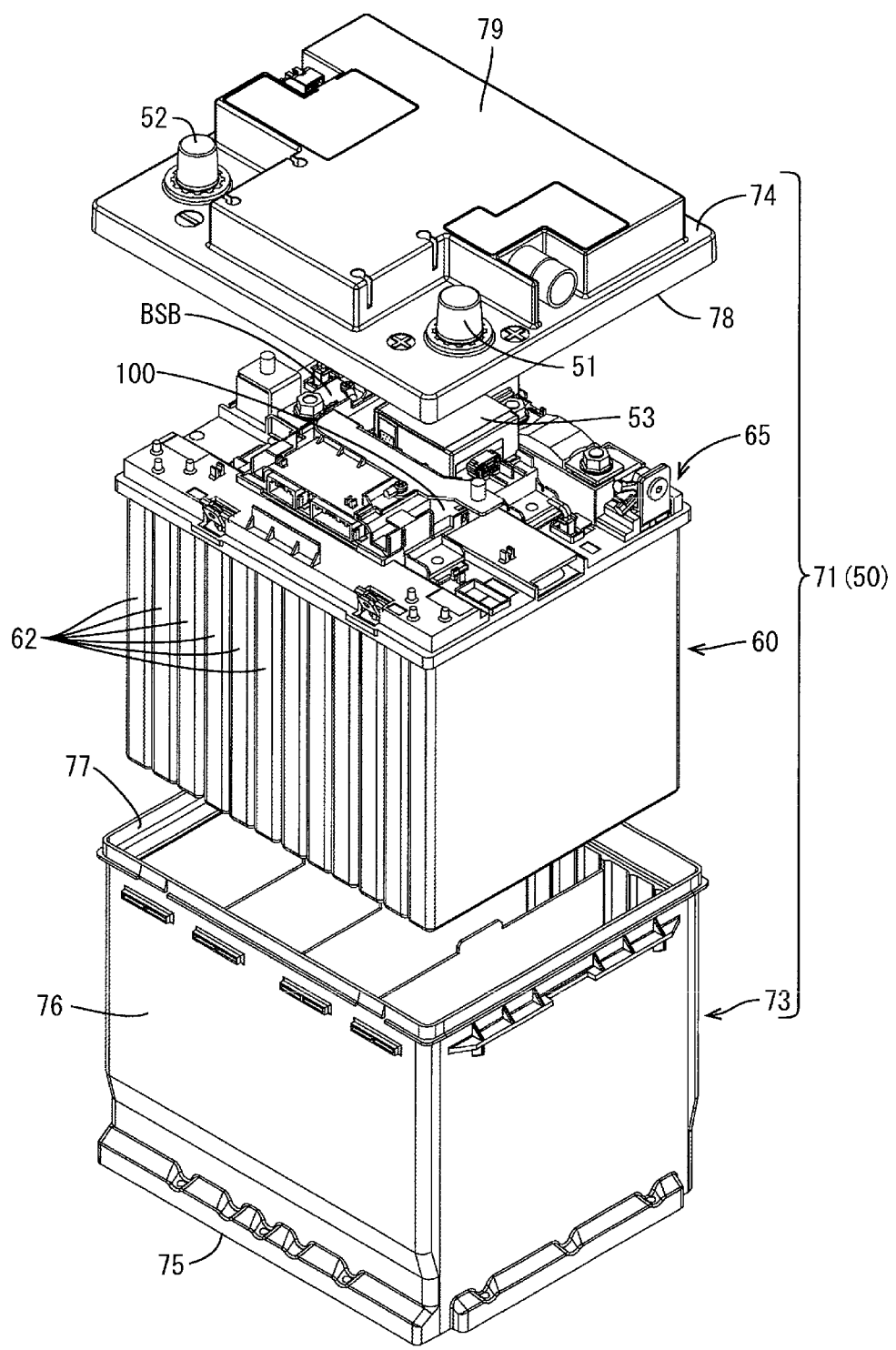
FIG. 2 is an exploded perspective view of a battery.

As illustrated in FIG. 1, an engine 20 and a battery 50 that is used for starting the engine 20 are mounted on a vehicle 10. The battery 50 is an example of "energy storage apparatus". As illustrated in FIG. 2, the battery 50 includes an assembled battery 60, a circuit board unit 65, and a container 71. On the vehicle 10, in place of the engine 20 (internal combustion engine), an energy storage apparatus for driving the vehicle or a fuel cell may be mounted.

The container 71 includes: a body 73 made of a synthetic resin material; and a lid body 74. The body 73 has a bottomed cylindrical shape. The body 73 includes a bottom surface portion 75 and four side surface portions 76. An upper opening portion 77 is formed at an upper end portion of the body 73 by four side surface portions 76.

The container 71 contains the assembled battery 60 and the circuit board unit 65. The circuit board unit 65 is disposed above the assembled battery 60.

The lid body 74 closes the upper opening portion 77 of the body 73. An outer peripheral wall 78 is formed on a periphery of the lid body 74. The lid body 74 has a protruding portion 79 having an approximately T shape as viewed in a plan view. On a front portion of the lid body 74, an external terminal 51 of positive electrode is fixed to one corner portion, and an external terminal 52 of a negative electrode is fixed to the other corner portion.

Figure 3:
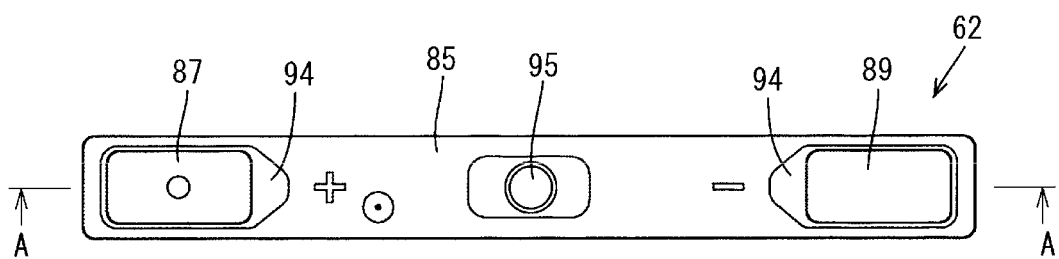
FIG. 3 is a plan view of a secondary battery cell.
Figure 4:
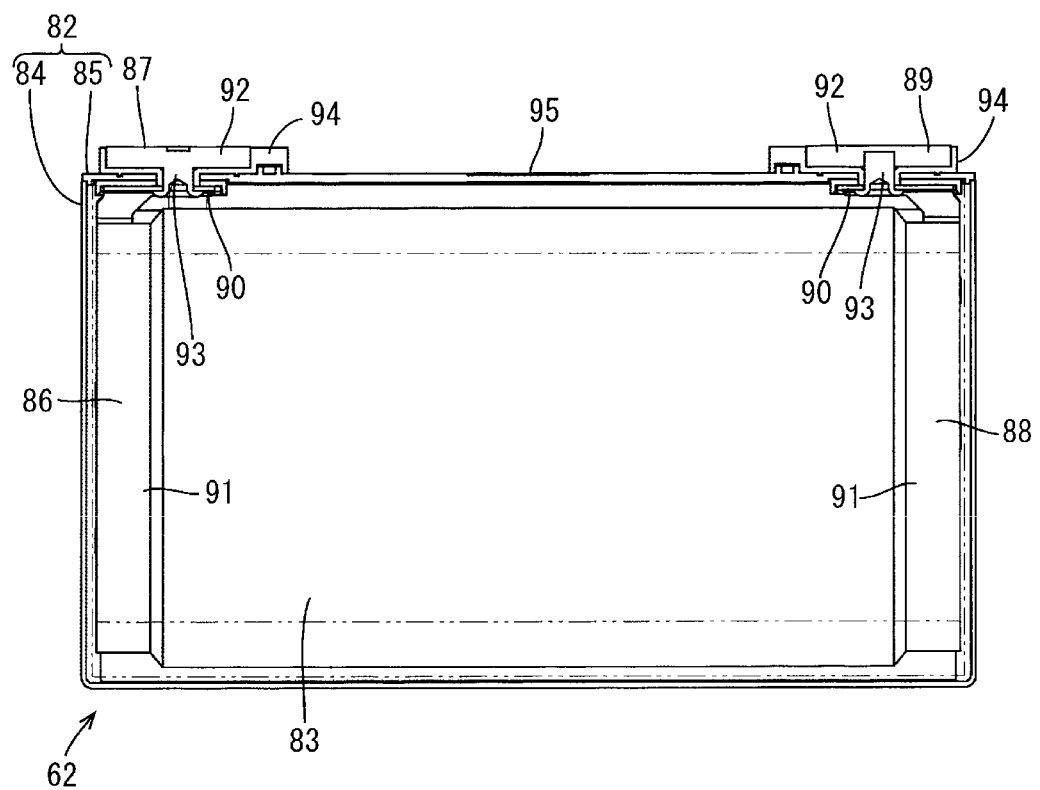
FIG. 4 is a cross-sectional view taken along a line A-A in FIG. 3.

As illustrated in FIG. 3 and FIG. 4, a secondary battery cell 62 is configured such that an electrode assembly 83 is accommodated in a case 82 having a rectangular parallelepiped shape together with a nonaqueous electrolyte. The secondary battery cell 62 is, as an example, a lithium ion secondary battery. The case 82 includes: a case body 84; and a lid 85 that closes an opening portion formed at an upper portion of the case body 84.

Although not illustrated in detail, the electrode assembly 83 illustrated in FIG. 4 is formed such that a separator formed of a porous resin film is disposed between a negative electrode element that is formed by applying an active material to a substrate formed of a copper foil, and a positive electrode element that is formed by applying an active material to a substrate formed of an aluminum foil. These elements each have a strip shape, and are wound in a flat shape so as to be accommodated in the case body 84 in a state where the position of the negative electrode element and the position of the positive electrode element are displaced on opposite sides in the width direction with respect to the separator.

The electrode assembly 83 may be of a stacked type instead of a wound type.

A positive electrode terminal 87 is connected to the positive electrode element via a positive electrode current collector 86, and a negative electrode terminal 89 is connected to the negative electrode element via a negative electrode current collector 88. The positive electrode current collector 86 and the negative electrode current collector 88 are each formed of a flat plate-like pedestal portion 90 and a leg portion 91 extending from the pedestal portion 90. A through hole is formed in the pedestal portion 90. The leg portion 91 is connected to the positive electrode element or the negative electrode element. The positive electrode terminal 87 and the negative electrode terminal 89 each include: a terminal body portion 92; and a shaft portion 93 protruding downward from a center portion of a lower surface of the terminal body portion 92. In such a configuration, the terminal body portion 92 and the shaft portion 93 of the positive electrode terminal 87 are integrally formed with each other using aluminum (a single material). In the negative electrode terminal 89, the terminal body portion 92 is made of aluminum, and the shaft portion 93 is made of copper. The negative electrode terminal 89 is formed by assembling the terminal body portion 92 and the shaft portion 93 to each other. The terminal body portion 92 of the positive electrode terminal 87 and the terminal body portion 92 of the negative electrode terminal 89 are disposed at both end portions of the lid 85 via gaskets 94 made of an insulating material. The terminal body portion 92 of the positive electrode terminal 87 and the terminal body portion 92 of the negative electrode terminal 89 are exposed outward from the gaskets 94.

The lid 85 has a pressure release valve 95. The pressure release valve 95 is positioned between the positive electrode terminal 87 and the negative electrode terminal 89. The pressure release valve 95 is a safety valve. The pressure release valve 95 is opened when an internal pressure P in the case 82 exceeds a limit value P3 so that an internal pressure P in the case 82 is lowered.

Figure 5:
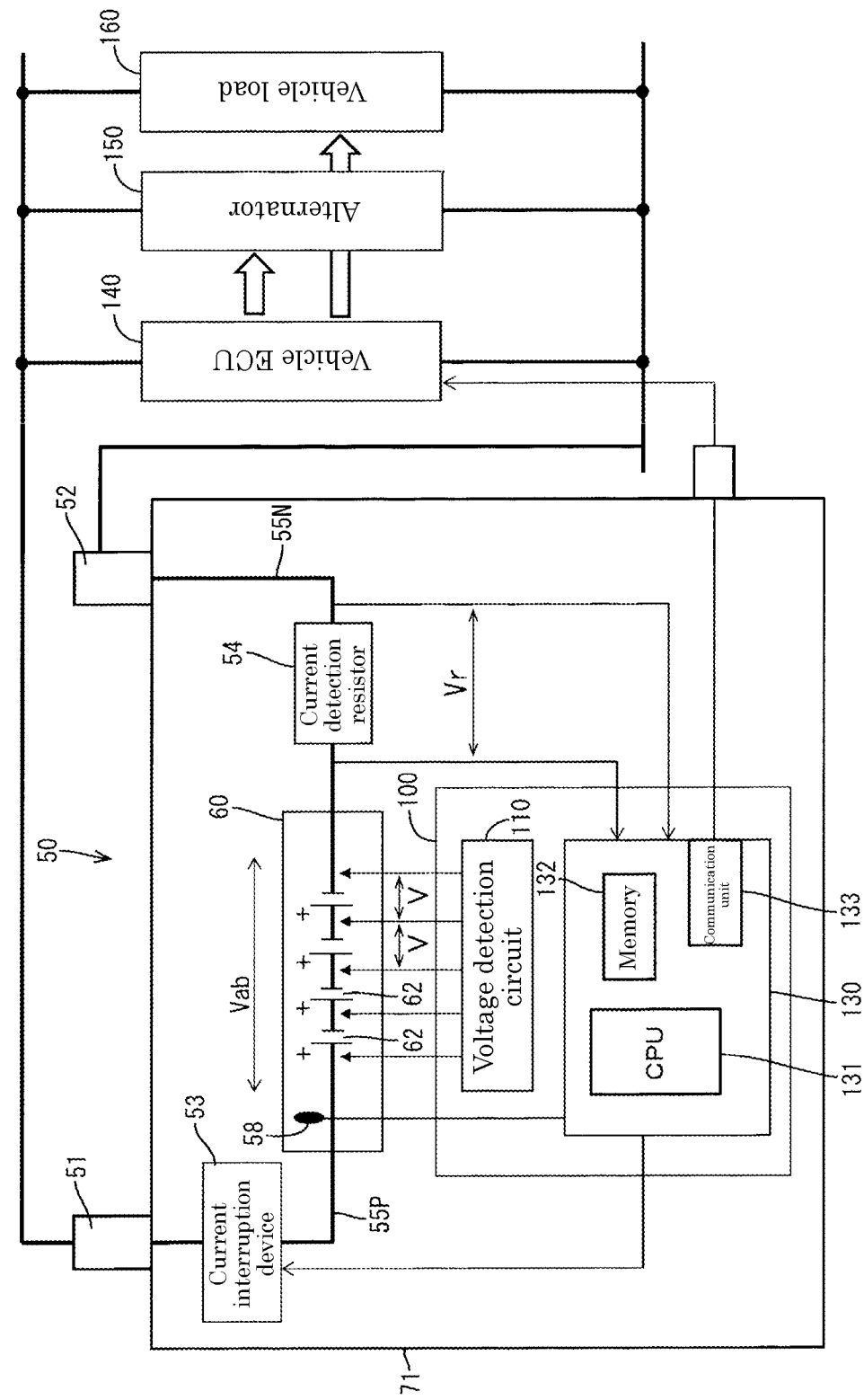
FIG. 5 is a block diagram showing the electrical configuration of the battery.

FIG. 5 is a block diagram illustrating an electrical configuration of the battery 50. The battery 50 includes: the assembled battery 60; a current detection resistor 54 that forms a current measurement unit; a current interruption device 53; a voltage detection circuit 110; a temperature sensor 58; and a management device 130.

Two external terminals 51, 52 of the battery 50 are electrically connected to a vehicle electronic control unit (ECU) 140, an alternator 150 that is a generator for generating electricity by the power of the engine 20, and a vehicle load 160 mounted on the vehicle 10. The vehicle ECU 140 is a vehicle control unit that controls the vehicle 10. The vehicle ECU 140 controls the alternator 150 and the vehicle load 160. The vehicle ECU 140 may also control a drive system such as an engine. The number of vehicle ECUs 140 is not limited to one, and may be plural.

In a case where an electricity generation amount of the alternator 150 is larger than the power consumption of the vehicle load 160 during driving of the engine 20, the battery 50 is charged with electricity by the alternator 150. In a case where an electricity generation amount of the alternator 150 is smaller than the power consumption of the vehicle load 160, the battery 50 discharges electricity to compensate for a shortage of electricity.

In a state where the engine 20 is stopped, the alternator 150 stops the generation of electricity. Accordingly, the battery 50 is brought into a state where the battery 50 is not charged with electricity. That is, the battery 50 is brought into a state where only discharging of electricity to the vehicle ECU 140 and the vehicle load 160 is performed.

The assembled battery 60 is formed of a plurality of secondary battery cells 62. Twelve secondary battery cells 62 are connected with each other in three parallels and four series. In FIG. 5, three secondary battery cells 62 that are connected in parallel are indicated by one battery symbol. The secondary battery cell 12 is an example of an "energy storage cell". A rated voltage of the battery 50 is 12 V.

The assembled battery 60, the current interruption device 53 and the current detection resistor 54 are connected in series via a power line 55P and a power line 55N. The power lines 55P, 55N can be each formed of a bus bar BSB that is a plate-like conductor made of a metal material such as copper. The power line 55P and the power line 55N are examples of a "current path".

The power line 55P connects the external terminal 51 of the positive electrode and the positive electrode of the assembled battery 60 to each other. The power line 55N connects the external terminal 52 of the negative electrode and a negative electrode of the assembled battery 60 to each other.

The current interruption device 53 is provided to a power line 55P on a positive electrode side. The current interruption device 53 may be a semiconductor switch such as an FET or a relay having a mechanical contact. The current interruption device 53 is normally closed, and is controlled to be closed in a normal operation state.

The current detection resistor 54 is provided to the power line 55N on a negative electrode side. A current I of the assembled battery 60 can be measured based on a voltage Vr between both ends of the current detection resistor 54.

The voltage detection circuit 110 can detect voltages V of the respective secondary battery cells 62 and a total voltage Vab of the assembled battery 60. The temperature sensor 58 is mounted on the assembled battery 60, and detects a temperature T of the assembled battery 60.

The management device 130 is mounted on the circuit board 100, and includes a CPU 131, a memory 132 and a communication unit 133. The management device 130 is an example of "a control device".

The communication unit 133 is connected to the vehicle ECU 140 via a signal line, and communicates with the vehicle ECU 140. The management device 130 can receive signals relating to operation states of the vehicle 10 (traveling, stopping, parking and the like) from the vehicle ECU 140 by communication.

The management device 130 monitors the state of the battery 50 based on an output of the voltage detection circuit 110, an output of the current detection resistor 54, and an output of a temperature sensor 58. That is, the management device 130 monitors the temperature T, the current I, and the total voltage Vab of the assembled battery 60.

The management device 130 performs processing of estimating a state of charge (SOC) [%] of the assembled battery 60 based on the current I of the assembled battery 60.

The state of charge (SOC) is a ratio of a residual capacity to a full charge capacity, and is expressed by the following equation (1).

$$SOC = (Cr/Co) \times 100 \qquad (1)$$

In equation (1), Co is a full charge capacity of the secondary battery, and Cr is a residual capacity of the secondary battery.

The SOC can be estimated based on an integral value of a current I with the lapse of time as expressed by the following equation (2). With respect to a symbol of the current, the symbol "plus" is given at the time of performing charging, and the symbol "minus" is given at the time of performing discharging.

$$SOC = SOCo + 100 \times \left( \int Idt/Co \right) \quad (2)$$

SOCo is an initial value of SOC, and I is a current.

Figure 8:
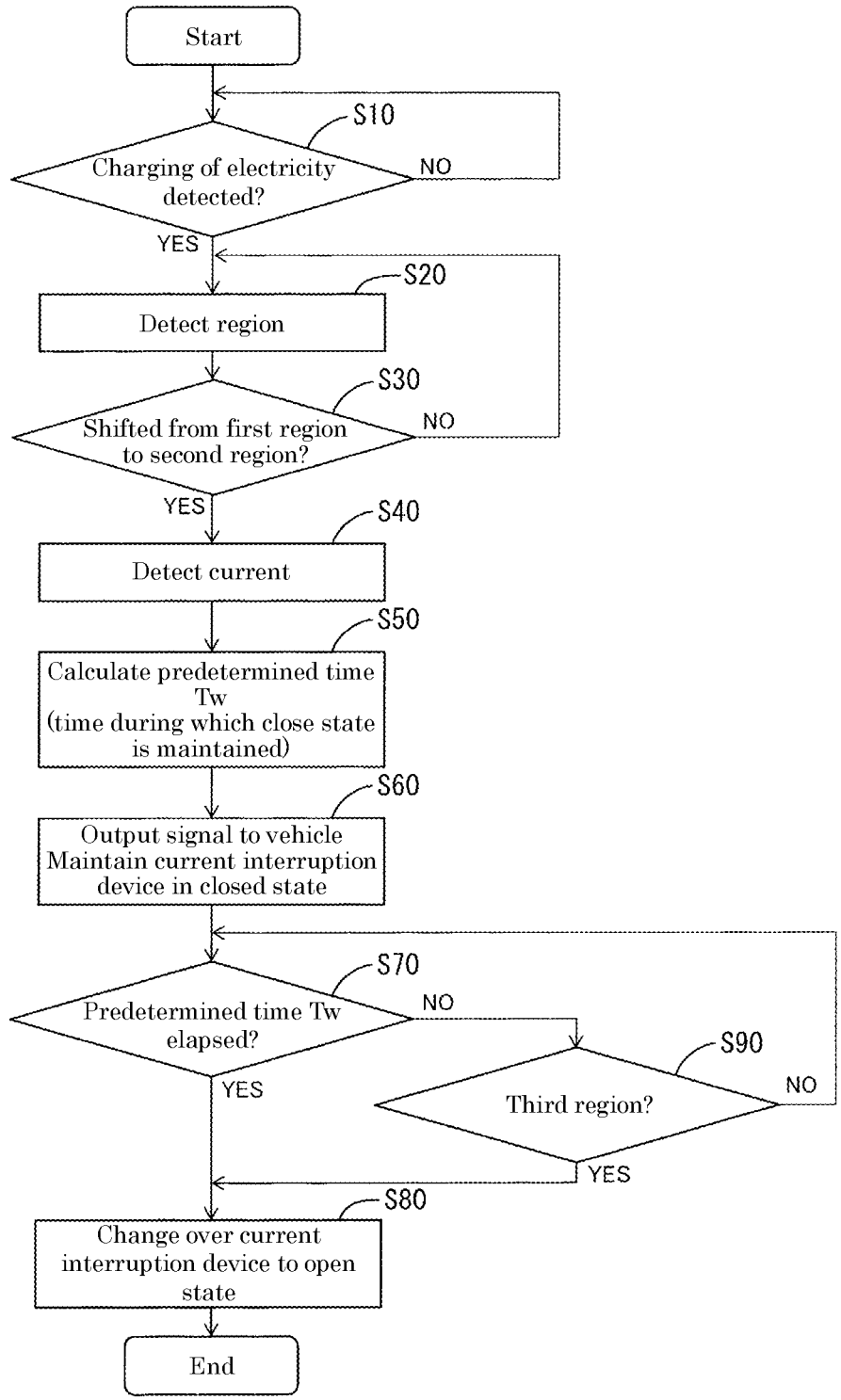
FIG. 8 is a flowchart illustrating a control flow of the current interruption device.

The memory 132 stores a program for estimating the SOC, and a program for executing the control flow illustrated in FIG. 8. Data necessary for executing these programs is stored in the memory 132. The program can be stored in a recording medium such as a CD-ROM, and can be transferred. The program can also be distributed using an electric communication line.

2. Characteristic of Secondary Battery Cell 62

Figure 6:
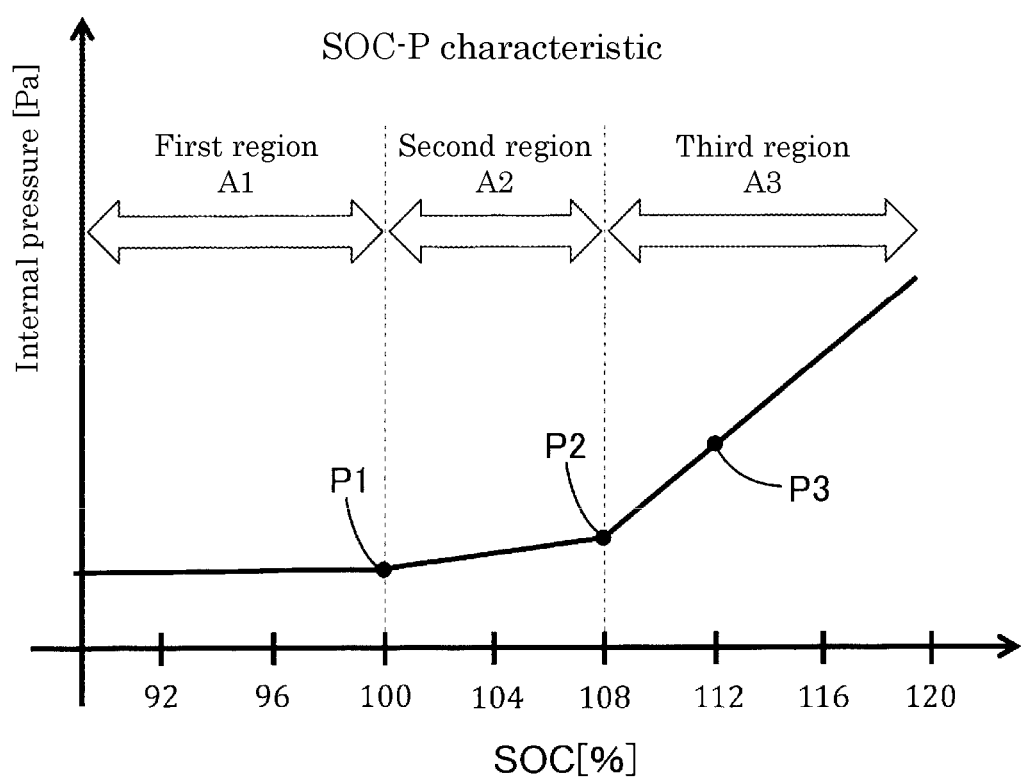
FIG. 6 is a graph illustrating an SOC-P characteristics of the battery.

FIG. 6 is a graph illustrating an SOC-P characteristic of the secondary battery cell 62. In the graph, SOC [%] is taken on an axis of abscissas, and an internal pressure P [Pa] of the secondary battery cell is taken on an axis of ordinates. The internal pressure P is a pressure in the case 82 of the secondary battery cell 62. The secondary battery cell 62 has three regions A1 to A3 that differ in a change amount of an internal pressure P with respect to a change amount of the SOC, that is, the inclination of a graph.

The first region A1 is a region where the SOC is 100 [%] or less, the second region A2 is a region where the SOC is 100 [%] to 108 [%], and the third region A3 is a region where the SOC is 108 [%] or more.

The first region A1 is a normal use region of the secondary battery cell 62. That is, the first region A1 is a region where an internal pressure P is equal to or less than a use upper limit value P1. The use upper limit value P1 is an upper limit value of the internal pressure P at which the secondary battery cell 62 can be used safely.

The second region A2 is a region where the internal pressure P is larger than the use upper limit value P1 and is a region where the internal pressure P is higher than the internal pressure P in the first region A1. In the second region A2, there is substantially no possibility that the secondary battery cell 62 is brought into an unsafe situation due to the use of the secondary battery cell 62. However, the second region A2 is not a region the use of which is recommendable.

The third region A3 is an unsafe region where the internal pressure P is higher than the internal pressure P in the second region A2 and is a region where it is difficult to secure the safety of the secondary battery cells 62. In the third region A3, there is a possibility that the secondary battery cell 62 is brought into un unsafe situation due to the use of the secondary battery cell 62.

A limit value P3 at which the pressure release valve 95 is operated falls within the third region A3. When the secondary battery cell 62 is shifted to the third region A3 and, thereafter, the internal pressure P is increased to the limit value P3, the pressure release valve 95 is opened so that the internal pressure P is lowered.

A change amount of an internal pressure P with respect to a change amount of a SOC is increased in the order of the third region A3, the second region A2, and the first region A1. In the first region A1, a change amount of the internal pressure P is small, and is equal to or less than a predetermined value.

Magnitude relationship of change amount of internal pressure: A3>A2>A1

As the reason why a change amount of the internal pressure differs between the regions, it is considered that the higher the SOC, the higher a voltage V of the secondary battery cell 62 becomes so that an electrolyte in the cell is decomposed and is likely to be easily vaporized.

The correlation exists between "internal pressure P" and "battery performance" of the secondary battery cell 62. That is, as the internal pressure P is increased, the battery performance is deteriorated. As an index of the "battery performance", an internal resistance [Ω] of the secondary battery cell 62, a capacity retention ratio [%] of the secondary battery cell 62, or a battery output [W] of the secondary battery cell 62 can be named. The battery performance may be determined comprehensively based on these indexes, or may be determined using any one of these indexes as a representative value.

When the battery 50 is used under the same condition (For example, the same C-rate), the internal pressure P in the second region A2 is higher than the internal pressure P in the first region A1. Accordingly, the second region A2 is a region where the battery performance is deteriorated. A change amount of an internal pressure P in the second region A2 is larger than a change amount of the internal pressure P in the first region A1. Accordingly, the second region A2 is a region where deterioration of the battery performance is accelerated (a region where a deterioration amount of the battery performance with respect to a change in SOC becomes large). An internal pressure P in the third region A3 is higher than the internal pressure P in the second region A2. Accordingly, the third region A3 is a region where the battery performance is further deteriorated. A change amount of an internal pressure P in the third region A3 is larger than a change amount of the internal pressure P in the second region A2. Accordingly, the third region A3 is a region where deterioration of the battery performance is further accelerated (a region where a deterioration amount of the battery performance with respect to a change in SOC becomes larger).

The decomposition of the electrolyte is irreversible. Accordingly, when the battery 50 experiences the second region A2 or the third region A3 even once, even after the battery 50 returns to the first region A1, the internal pressure P does not return to an original value and hence, the battery performance is also not recovered.

3. Securing of Safety and Suppression of Unsafe Phenomenon of Vehicle 10

The vehicle ECU 140 performs a charge control of the alternator 150 such that charging does not exceed SOC of 100% that is an upper limit value of the SOC in the first region A1. However, there may be a case where the charge control becomes impossible due to a failure of the alternator 150 or the like. In this case even when charging of electricity exceeds the SOC 100%, the charging of electricity is continued. As a result, there may be a case where the assembled battery 60 is shifted from the first region A1 that is a normal use region to the second region A2 where the internal pressure P is high so that battery performance is deteriorated.

Figure 7:
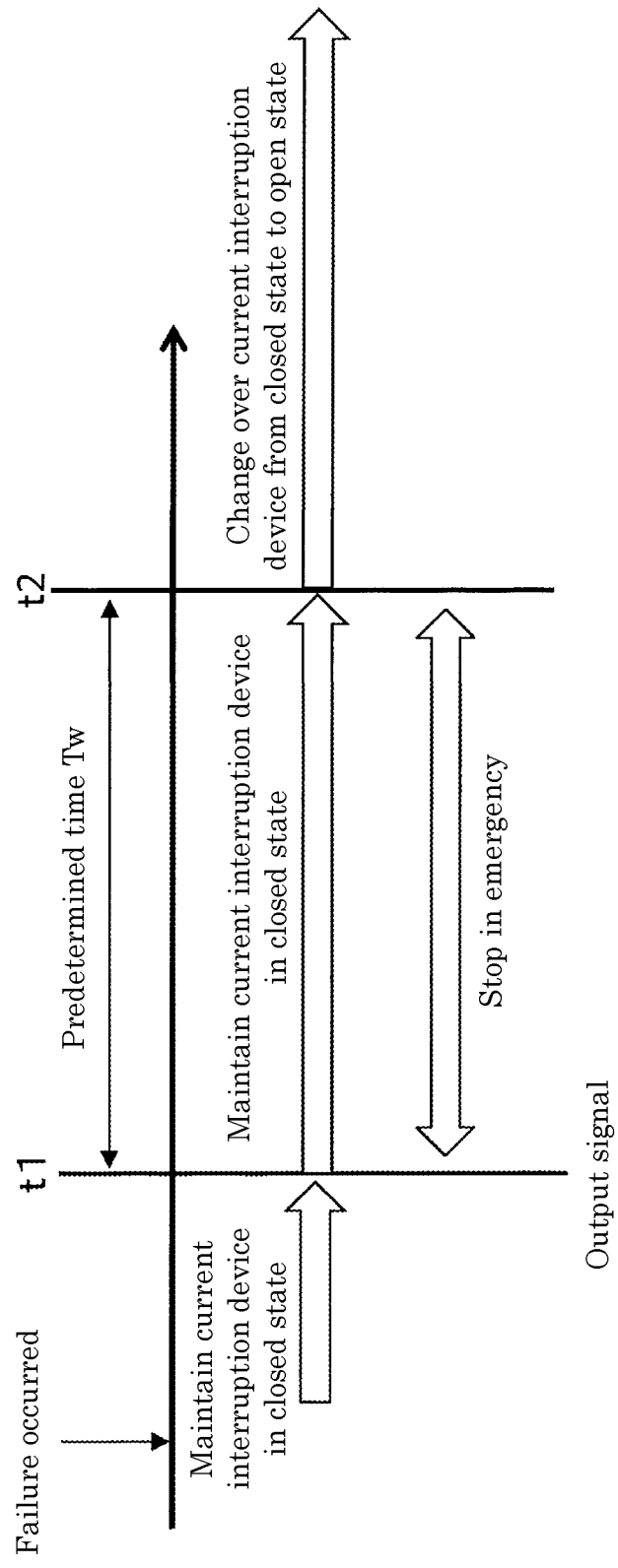
FIG. 7 is an explanatory diagram of a closed state and an open state of a current interruption device after the occurrence of failure.

The management device 130 monitors an SOC and a voltage, and outputs a signal that notifies the shifting of the region A to the vehicle ECU 140 when the assembled battery 60 is shifted to the second region A2 (at a point of time t1 illustrated in FIG. 7). When the vehicle ECU 140 receives a signal, the vehicle ECU 140 requests or urges a driver to urgently stop the vehicle 10 by, for example, turning on a warning lamp.

The management device 130, after outputting a signal to the vehicle ECU 140, maintains the current interruption device 53 in a closed state for a predetermined time Tw (t1 to t2 illustrated in FIG. 7) without switching the current interruption device 53 from the closed state to an open state.

By maintaining the current interruption device 53 in a closed state for the predetermined time Tw after outputting the signal, even when the supply of electricity from the alternator 150 having a failure to the vehicle 10 is stopped, it is possible to supply electricity from the battery 50 to the vehicle 10.

Accordingly, the power supply of the vehicle 10 can be maintained for the predetermined time Tw and hence, in a case where the vehicle 10 is traveling, the driver can stop the vehicle 10 in emergency at a safe place.

After the lapse of the predetermined time Tw (after t2 in FIG. 7), the management device 130 may switch the current interruption device 53 from a closed state to an open state thus prohibiting the reuse of the battery 50. The reason that the reuse is prohibited is as follows. The assembled battery 60 is used in the second region A2 for the predetermined time Tw after outputting the signal and hence, the internal pressure P in the secondary battery cell 62 becomes larger than the use upper limit value P1 at which the assembled battery 60 can be used safely.

A change amount of the internal pressure P in the secondary battery cell 62 that is shifted to the second region A2 depends on the temperature T of the assembled battery 60. That is, the higher the temperature T of the battery 50, the larger the change in the internal pressure P becomes. The change in the SOC depends on the total voltage Vab and the charge current I. Accordingly, the larger the total voltage Vab or the larger the charge current I, the assembled battery 60 is liable to be shifted from the second region A2 to the third region A3. The reason that the higher the total voltage Vab, the more easily the region A is shifted is as follows. That is, the higher the total voltage, the higher the charge voltage becomes and hence, the charge current I is increased.

Accordingly, the predetermined time Tw may be changed based on the total voltage Vab, the charge current I, and the temperature T of the assembled battery 60 at a point of time that a signal is outputted. That is, the lower the total voltage Vab of the battery 50 at the point of time that the signal is outputted, the longer the predetermined time Tw may be set. The smaller the charge current I, the longer the predetermined time Tw may be set. The lower the temperature T, the longer the predetermined time Tw may be set. As the predetermined time Tw, it is sufficient to secure approximately two to three minutes.

FIG. 8 is a flowchart illustrating a control flow of the current interruption device 53.

The control flow includes nine steps of S10 to S90. The steps are performed when the battery 50 receives a traveling start signal that indicates the starting of traveling of the vehicle 10 from the vehicle ECU 140.

When the management device 130 receives the traveling start signal, the management device 130 detects the presence or the non-presence of charging of electricity based on a measured value and its polarity of the current detection resistor 54 (S10).

When the management device 130 detects charging of electricity, the management detects the regions A1 to A3 of the battery 50 based on the present value of the SOC (S20).

The SOC is usually 100% or less and hence, the battery 50 is operated in the first region A1.

Then, the management device 130 determines whether or not the assembled battery 60 has shifted from the first region A1 to the second region A2 (S30). When the assembled battery 60 is not shifted from the first region A1 to the second region A2, the processing returns to the step S20.

When the charge control of the vehicle ECU 140 becomes impossible due to a failure of the alternator or the like, there may be a case where the battery 50 is continuously charged with electricity during traveling of the vehicle. In this case, there is a possibility that the SOC exceeds 100%.

When the SOC exceeds 100% and the assembled battery 60 is shifted to the second region A2, the management device 130 calculates the predetermined time Tw based on the total voltage Vab, the charge current I, and the temperature T of the battery 50 (S40, S50).

The predetermined time Tw can be calculated by using, for example, a two-dimensional data table in which I and V are used as two variables. FIG. 9 illustrates an example of the data table.

In this embodiment, the data table in FIG. 9 is prepared for each temperature T. The management device 130 selects the data table corresponding to an assembled battery temperature at the point of time that the assembled battery 60 is shifted to the second region, and determines the predetermined time Tw based on the total voltage Vab and the charge current I of the assembled battery 60 at the point of time that the assembled battery 60 is shifted to the second region.

Then, the management device 130 transmits a signal that notifies shifting of the assembled battery 60 to the region A to the vehicle 10. At this point of time, the predetermined time Tw may be also notified.

The management device 130, after outputting the signal, maintains the current interruption device 53 in a closed state (S60). Then, the management device 130 counts an elapsed time after outputting of the signal, and determines whether the predetermined time Tw has elapsed from the outputting of the signal (S70).

When the predetermined time Tw has elapsed from outputting of the signal, the management device 130 issues a command to the current interruption device 53 so as to switch the current interruption device 53 from a closed state to an open state. By switching the state of the current interruption device 53, it is possible to interrupt the flow of a current I to the assembled battery 60.

The management device 130, during a period that the predetermined time Tw is counted, determines whether or not the assembled battery 60 is shifted from the second region A2 to the third region A3 (S90).

When the secondary battery cells 62 are shifted to the third region A3, the current interruption device 53 is switched from a closed state to an open state even before the predetermined time Tw elapses. By switching the current interruption device 53 to an open state, it is possible to prevent the assembled battery 60 that is shifted to the third region A3 from being brought into an unsafe situation. That is, it is possible to suppress the opening of the pressure release valve 95.

4. Description of Advantageous Effects

In the above-mentioned configuration, when the assembled battery 60 is shifted from the first region A1 to the second region A2, the management device 130 outputs a signal that notifies the shifting of the assembled battery 60 to the region A to the vehicle ECU 140. The management device 130, after outputting the signal, maintains the current interruption device 53 in a closed state for the predetermined time Tw without switching the current interruption device 53 from a closed state to an open state.

The power supply of the vehicle 10 can be maintained for the predetermined time Tw after outputting of the signal. Accordingly, in a case where the vehicle is traveling, a driver can take a safety measure such as an emergency stop of the vehicle 10 at a safe place. Accordingly, the safety of the vehicle 10 can be secured.

With such a configuration, in a case where the assembled battery 60 is shifted from the second region A2 to the third region A3 after outputting of the signal, the current interruption device 53 is brought into an open state thus interrupting a current. By interrupting the current, it is possible to prevent the battery 50 that is shifted to the third region A3 from being brought into an unsafe situation.

With such a configuration, it is possible to prevent the battery 50 from being brought into an unsafe situation while maintaining safety of the vehicle 10 by securing the supply of electricity.

Second Embodiment

Figure 10:
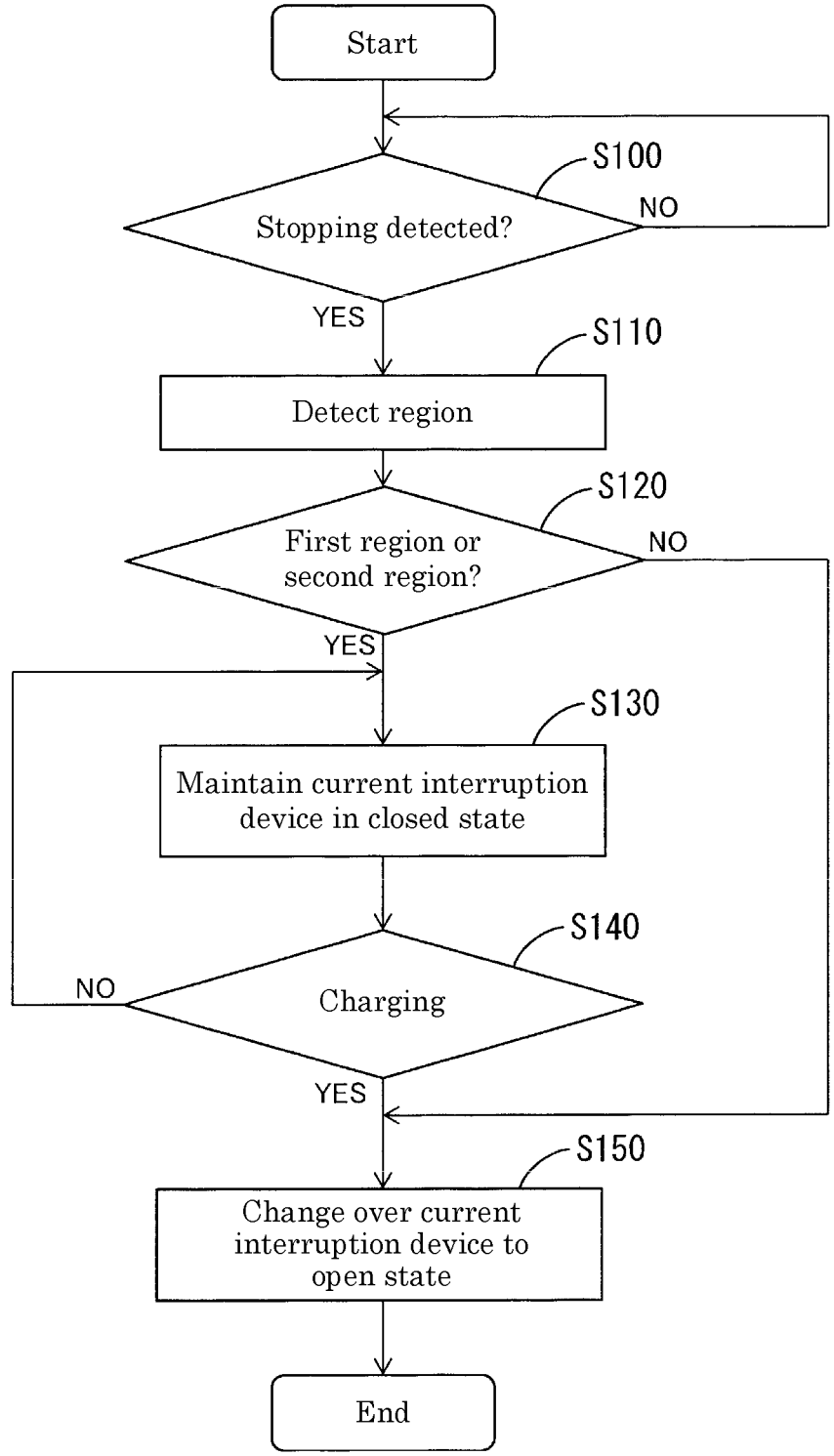
FIG. 10 is a flowchart illustrating a control flow of the current interruption device.

The second embodiment discloses the control of the current interruption device 53 after an emergency stop. FIG. 10 is a flowchart illustrating a control flow of the current interruption device 53 after the emergency stop.

The control flow illustrated in FIG. 10 is performed in parallel with the control in which the management device 130 maintains the current interruption device 53 in a closed state after a signal that notifies the shifting of the battery cells 62 to the region A to the vehicle ECU 140 from the management device 130 is outputted along with the shifting of the battery cells 62 to the second region A2.

The management device 130 detects whether or not the vehicle 10 in the emergency operation that has received the signal notifying the shift of the battery cells 62 to the region A is stopped (S100). The determination of the stop may be made by comparing the current I of the assembled battery 60 with a threshold value, or may be made by communication with the vehicle ECU 140. That is, when a signal relating to the operation state (traveling, stopping, parking, or the like) of the vehicle 10 can be received from the vehicle ECU 140, the determination of stopping may be made based on the presence or non-presence of the reception of the signal.

When the management device 130 detects the stop of the vehicle 10, the management device 130 determines the region in which the assembled battery 60 is located among the first region A1, the second region A2, and the third region A3 based on the present value of the SOC (S120).

When the management device 130 determines that the assembled battery 60 is located in the third region A3 (S120: NO), the management device 130 changes over the current interruption device 53 from a closed state to an open state (S150).

By switching the current interruption device 53 to an open state thus interrupting a current I, it is possible to prevent the assembled battery 60 that is shifted to the third region A3 from being brought into an unsafe situation.

When the assembled battery 60 is located in the first region A1 or in the second region A2 (S120: YES), the management device 130 determines that the assembled battery 60 can be temporarily used except for charging electricity, and maintains the current interruption device 53 in a closed state (S130).

Then, the management device 130 monitors an output of the current detection resistor 54, and determines whether the assembled battery 60 is "being charged with electricity" or "is discharging electricity" (S140). "Being charged with electricity" and "is discharging electricity" can be determined based on the polarity of a current measurement value.

When the assembled battery 60 is being charged (S140: YES), the management device 130 changes over the current interruption device 53 to an open state and interrupts the current so as to prohibit the charging of electricity (S150). By prohibiting the charging of electricity, it is possible to prevent the assembled battery 60 from being shifted to the third region A3.

When the assembled battery 60 is discharging electricity (S140: NO), the management device 130 maintains the current interruption device 53 in a closed state thus permitting the assembled battery 60 to discharge electricity (S130). The maintaining the current interruption device 53 in a closed state is continued even after a predetermined time Tw has elapsed from outputting of the signal.

By permitting the assembled battery 60 to discharge electricity, an emergency signal such as turning-on of a hazard lamp can be issued using the battery 50 as the power supply. Accordingly, it is possible to notify that the vehicle 10 is in an emergency stop to the outside.

After the emergency stop of the vehicle 10, the SOC of the assembled battery 60 is lowered by the discharging of electricity. Accordingly, at the time of exchanging the battery 50 that is shifted to the second region A2, the battery 50 can be removed from the vehicle 10 in a state where the SOC is deteriorated. Accordingly, the safety of an operation can be secured.

Third Embodiment

In the second embodiment, in the case where the assembled battery 60 is charged with electricity after stopping of the vehicle in emergency, the current interruption device 53 is opened so that a current is interrupted (S140: YES, S150).

The current interruption conditions may include conditions (B) to (D).

(A) Charging of electricity after stopping of a vehicle in emergency
(B) The case where the safety of a driver can be confirmed
(C) The use of the assembled battery 60 after stopping of a vehicle in emergency
(D) Discharging of electricity at a large current of a predetermined value or more
(E) The use of the assembled battery 60 at a battery temperature of a predetermined value or more
(F) The use in an overdischarging state All conditions (A) to (F) may be set as "interruption conditions", and a current may be interrupted when any one of the conditions (A) to (F) is satisfied. Some conditions out of the conditions (A) to (F) may be set as the interruption conditions. For example, the condition (A) and the condition (C) are set as the interruption conditions, and a current may be interrupted when the condition (A) or the condition (C) is satisfied. The interruption condition is not limited to the combination of the condition (A) and the condition (C), and other combinations may be used as the interruption condition. The number of combinations may be two or more, such as the combination of the conditions (A) to (C).

The reason why the condition (B) is included in the interruption condition is as follows. In a case where the safety of a driver can be confirmed, it is unnecessary to supply electricity to the vehicle 10 anymore. The presence or the non-presence of the confirmation of safety may be determined whether the vehicle 10 is shifted to parking after an emergency stop. The presence or absence of parking may be determined based on communication with the vehicle ECU 140. The presence or non-presence of parking may be determined by a current value.

The reason why the condition (C) is included in the interruption condition is as follows. Due to the condition (C), it is possible to prevent the battery 50 that has experienced the second region A2 from being used for the same applications as usual (discharging of electricity to a vehicle load or charging of electricity by an alternator) in re-traveling of the vehicle 10. The presence or the non-presence of re-traveling may be determined based on communication with the vehicle ECU 140.

The reason why the condition (D) and the condition (E) are included in the interruption condition is as follows. Due to the condition (D) or the condition (E), it is possible to prevent the battery 50 that has experienced the second region A2 from abnormally generating heat so that the battery 50 is brought into an unsafe situation.

The reason why the condition (F) is included in the interruption condition is as follows. Due to the condition (F), when overdischarging occurs, electricity cannot be supplied to the vehicle 10 anymore.

Fourth Embodiment

In the first to third embodiments, when the assembled battery 60 is shifted from the first region A1 to the second region A2, the current interruption device 53 is maintained in a closed state for the predetermined time Tw in order to maintain the power supply of the vehicle 10 which is brought into an emergency stop.

As a cause of the shifting of the assembled battery 60 from the first region A1 to the second region A2, the following is conceivable in addition to a failure in the alternator 150 during traveling.
  (a) Charging by external charger with different charge voltage (for example, a 24V charger)
  (b) Reverse connection of booster cable at jump start
  (c) External short circuit of battery (short circuit between external terminals 51 and 52)

Even in a case where the assembled battery 60 is shifted from the first region A1 to the second region A2, when the battery 50 is not mounted on the vehicle or when the vehicle 10 is not traveling, the necessity of maintaining the power supply is small.

In a case where the assembled battery 60 is shifted from the first region A1 to the second region A2, the management device 130 changes over the current interruption device 53 from a closed state to an open state in the following cases (S350).
  (1) The case where the battery is not mounted on the vehicle 10 (S310: NO)
  (2) The case where the vehicle 10 is not traveling (S320: NO)

In the cases (1) and (2), by switching the current interruption device 53 into an open state thus interrupting a current, it is possible to prevent the battery 50 from being used in the second region A2. By preventing the use of the battery 50 in the second region A2, the battery 50 can be reused.

Figure 11:
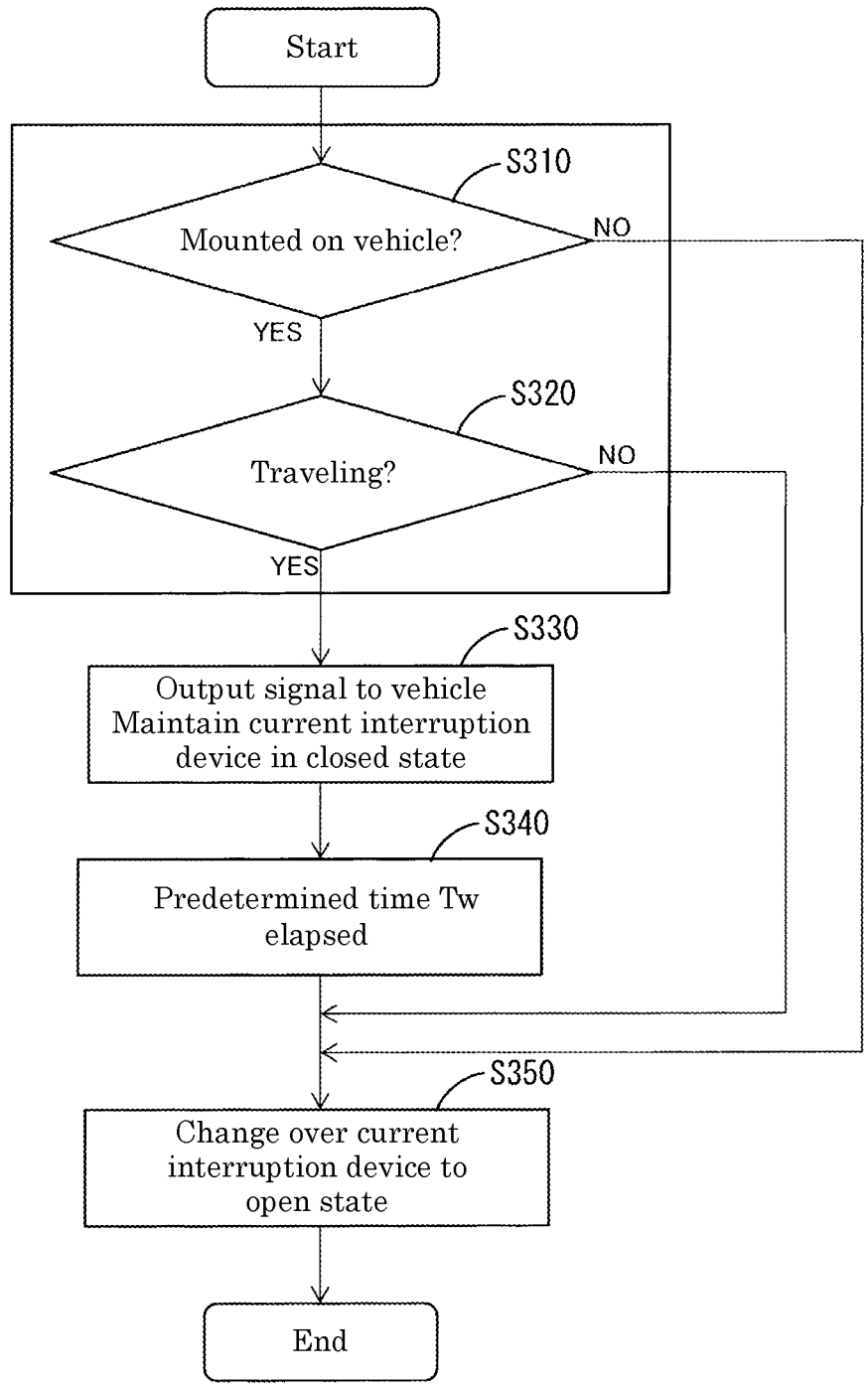
FIG. 11 is a flowchart illustrating a control flow of the current interruption device.

FIG. 11 is a flowchart illustrating a control flow of the current interruption device 53 after the battery 50 is shifted to the second region A2. Before the battery 50 is shifted to the second region A2, the current interruption device 53 is in a closed state.

When the battery 50 is shifted from the first region A1 to the second region A2, the management device 130 determines whether or not the battery 50 is "not mounted on the vehicle" (S310).

The determination of "not mounted on a vehicle" may be made based on the presence or the non-presence of the communication line connection or may be made based on a current value. That is, when the communication line is not connected or when a current value is substantially zero for a long period of time, the management device 130 can determine that the battery 50 is "not mounted on a vehicle".

When the management device 130 determines that the battery 50 is "not mounted on a vehicle" (S310: NO), the management device 130 immediately changes over the current interruption device 53 from a closed state to an open state (S350).

When the management device 130 determines that the battery 50 is "mounted on a vehicle" (S310: YES), the management device 130 determines whether or not the vehicle 10 is "traveling" (S320).

The management device 130 can determine whether or not the vehicle 10 is traveling based on the communication with the vehicle ECU 140. That is, in a case where the communication is frequently performed between the management device 130 and the vehicle ECU 140, the management device 130 can determine that the vehicle is traveling. On the other hand, in a case where there is no communication for a predetermined period, the management device 130 can determine that the vehicle is not traveling. In a case where a signal relating to an operation state (traveling, stopping, parking, or the like) of the vehicle 10 can be received from the vehicle ECU 140, the management device 130 can determine whether or not the vehicle 10 is traveling based on the presence or non-presence of the reception of the signal.

When the management device 130 determines that the vehicle 10 is "not traveling" (S320: NO), the management device 130 immediately changes over the current interruption device 53 from a closed state to an open state (S350).

When determining that the vehicle 10 is "traveling" (S320: YES), the management device 130 outputs a signal notifying the shifting of the battery to the region A to the vehicle ECU 140. The management device 130 maintains the current interruption device 53 in a closed state (S330).

The management device 130 counts an elapsed time from a point of time that a signal is outputted to the vehicle ECU 140. When the predetermined time Tw has elapsed after the signal is outputted, the management device 130 changes over the current interruption device 53 from a closed state to an open state.

In the above-mentioned configuration, when the region A of the assembled battery 60 is shifted from the first region A1 to the second region A2, the management device 130 changes over the connection state of the current interruption device 53 based on whether the vehicle 10 on which the battery 50 is mounted is traveling or not traveling.

Accordingly, it is possible to minimize the use of the assembled battery 60 in the second region A2 where an internal pressure is high while securing the safety of the vehicle. That is, in the case where the vehicle 10 is traveling, after the region A of the assembled battery 60 is shifted to the second region A2 from the first region A1, the management device 130 maintains the power supply for a predetermined time by closing the current interruption device 53.

Accordingly, the safety of the vehicle can be secured. In the case where the vehicle 10 is not traveling, immediately after the region of the assembled battery 60 is shifted from the first region A1 to the second region A2, the management device 130 opens the current interruption device 53 so as to interrupt a current. Accordingly, the use of the assembled battery 60 in the second region A2 can be minimized.

In the case where the vehicle 10 is not traveling, the deterioration of the battery 50 can be prevented by preventing the use of the assembled battery 60 in the second region A2. Accordingly, the battery 50 can be reused. The same goes for the case where the battery 50 is "not mounted on the vehicle".

Fifth Embodiment

In the first embodiment, the region of the battery 50 is divided into three regions A1 to A3 based on the relationship between the SOC and the internal pressure P of the assembled battery 60. In the fifth embodiment, the region of the battery 50 is divided into three regions A1 to A3 based on the relationship between the temperature T and the internal pressure P of the assembled battery 60.

Figure 12:
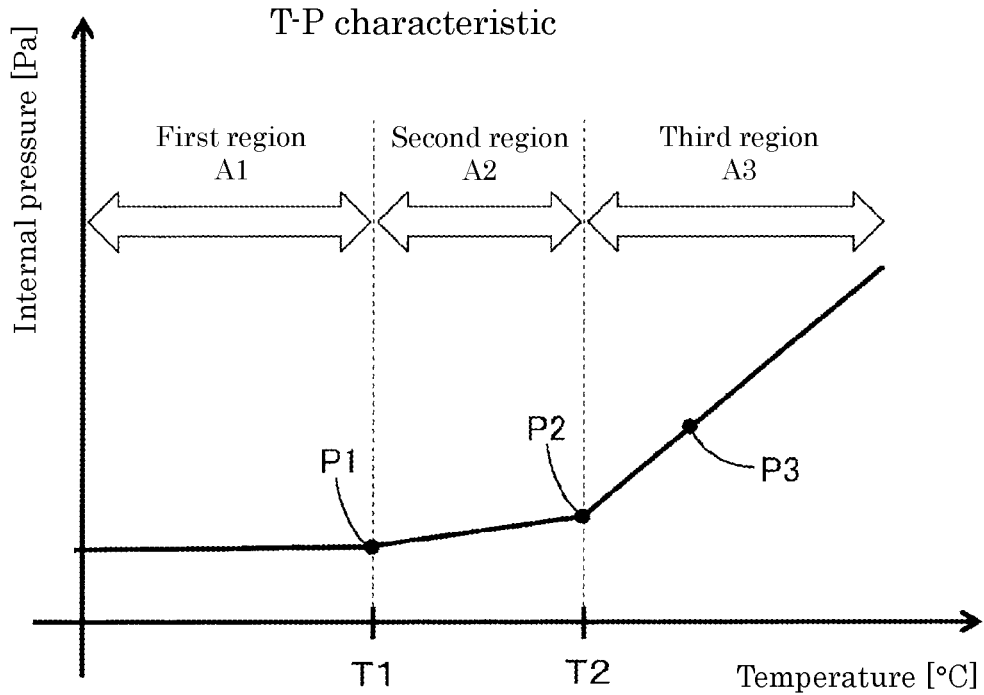
FIG. 12 is a graph illustrating a T-P characteristics of the battery.

FIG. 12 is a graph illustrating a T-P characteristic of the secondary battery cell 62. In the graph, the temperature T of the secondary battery cell 62 is taken on an axis of abscissas, and an internal pressure P of the secondary battery cell 62 is taken on an axis of ordinates.

The secondary battery cell 62 has three regions A1 to A3 that differ in a change amount of an internal pressure P with respect to a change amount of the temperature T, that is, the inclination of the graph.

The first region A1 is a region where the temperature T of the assembled battery 60 is T1 [° C.] or below, the second region A2 is a region where the temperature of the assembled battery 60 falls within a range of from T1 [° C.] to T2 [° C.], and the third region A3 is a region where the temperature T of the assembled battery 60 is T2 [C] or above.

The reason why a change amount of the internal pressure P differs between the regions is considered as follows. The higher the temperature T, the more likely it is that a chemical reaction is easily generated in the battery so that an electrolyte is easily decomposed and vaporized.

The management device 130 monitors the temperature T of the assembled battery 60 based on an output of the temperature sensor 58, and maintains the current interruption device 53 in a closed state when the temperature T falls within the first region A1 which is a normal use region.

In a case where the temperature T of the assembled battery 60 is shifted to the second region A2 where the internal pressure is high, the management device 130 outputs a signal that notifies the shifting of the region A of the assembled battery 60 to the vehicle ECU 140. The management device 130, after the signal is outputted, maintains the current interruption device 53 in a closed state for a predetermined time Tw.

By maintaining the closed state of the current interruption device 53 for the predetermined time Tw, the power supply can be maintained until the vehicle 10 is stopped in emergency. The predetermined time Tw may be changed based on a total voltage Vab and a current I of the assembled battery 60 at a stage (at a point of time) that the temperature T of the assembled battery 60 is shifted from the first region A1 to the second region A2.

The management device 130, after the signal is outputted to the vehicle 10, monitors the temperature T of the assembled battery 60. In a case where the temperature T of the assembled battery 60 is shifted to the third region A3 that is an unsafe region, the management device 130 transmits a command to the current interruption device 53 so as to switch the current interruption device 53 from a closed state to an open state.

By bringing the current interruption device 53 into an open state thus interrupting a current, it is possible to prevent the battery 50 that is shifted to the third region A3 from being brought into an unsafe situation.

With such a configuration, in the same manner as the embodiments 1 to 4, it is possible to prevent the battery 50 from being brought into an unsafe situation while maintaining safety of the vehicle 10 by securing the supply of electricity at the time of an emergency stop of the vehicle.

Sixth Embodiment

In the fifth embodiment, the region of the battery 50 is divided into three regions A1 to A3 based on the relationship between the temperature T and the internal pressure P of the assembled battery 60. The temperature T of the assembled battery 60 is correlated with the current I. That is, the larger the current I, the more likely it is that the temperature of the assembled battery 60 is easily increased.

In the sixth embodiment, the region of the battery 50 is divided into three regions A1 to A3 based on the relationship between the current I and the internal pressure P of the assembled battery 60.

Figure 13:
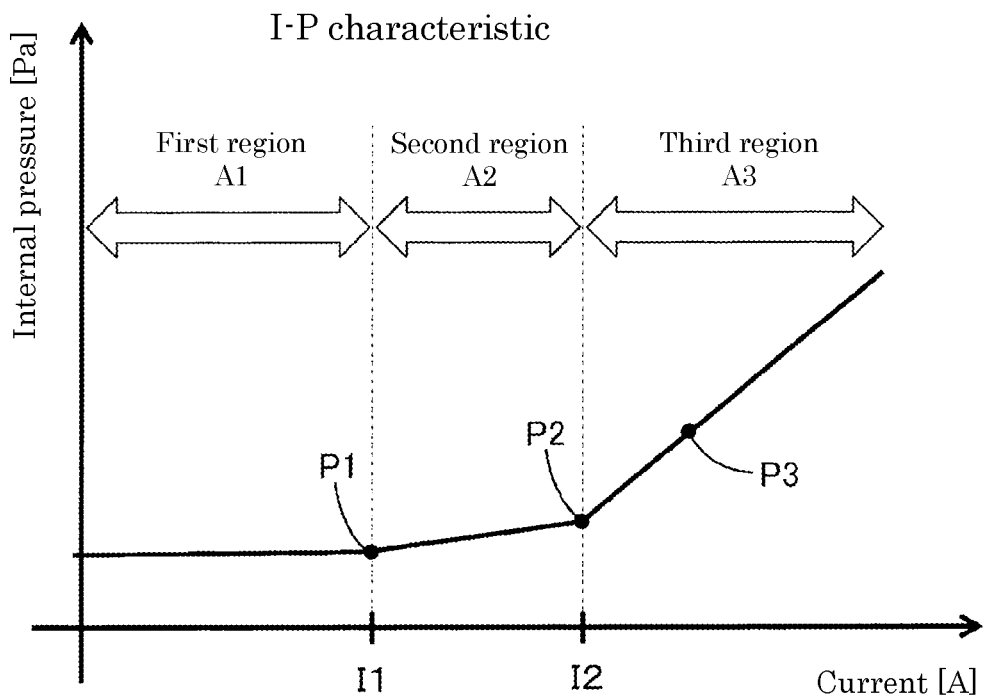
FIG. 13 is a graph illustrating an I-P characteristics of the battery.

FIG. 13 is a graph illustrating an I-P characteristic of the secondary battery cell 62. In the graph, a current I of the secondary battery cell 62 is taken on an axis of abscissas, and an internal pressure P of the secondary battery cell 62 is taken on an axis of ordinates. The current I may be a charge current or a discharge current.

The first region A1 is a region where the current I of the assembled battery 60 is I1 [° C.] or less, the second region A2 is a region where the current I of the assembled battery 60 falls within a range of from I1 [A] to I2 [A], and the third region A3 is a region where the current I of the assembled battery 60 is I2 [A] or more.

The management device 130 monitors the current I of the assembled battery 60 based on an output of the current detection resistor 54. In a case where the current I falls within the first region A1 that is a normal use region, the management device 130 maintains the current interruption device 53 in a closed state.

In a case where the current I of the assembled battery 60 is shifted to the second region A2 where the internal pressure is high, the management device 130 outputs a signal that notifies the shifting of the region A of the assembled battery 60 to the vehicle ECU 140. The management device 130, after the signal is outputted, maintains the current interruption device 53 in a closed state for a predetermined time Tw.

By maintaining the current interruption device 53 in a closed state for the predetermined time Tw, the power supply can be maintained until an emergency stop of the vehicle 10. The predetermined time Tw may be changed based on a total voltage Vab and a temperature T of the assembled battery 60 at a stage (at a point of time) that the current I of the assembled battery 60 is shifted from the first region A1 to the second region A2.

The management device 130, after the signal is outputted to the vehicle 10, monitors the current I of the assembled battery 60. In a case where the current I of the assembled battery 60 is shifted to the third region A3 that is an unsafe region, the management device 130 transmits a command to the current interruption device 53 so as to switch the current interruption device 53 from a closed state to an open state.

By bringing the current interruption device 53 into an open state thus interrupting the current I, it is possible to prevent the battery 50 that is shifted to the third region A3 from being brought into an unsafe situation. The current interruption is immediately performed in a case where the assembled battery 60 is shifted to the third region A3 regardless of whether or not the predetermined time Tw has elapsed.

With such a configuration, in the same manner as the first to fifth embodiments, it is possible to prevent the battery 50 from being brought into an unsafe situation while maintaining safety of the vehicle 10 by securing the supply of electricity at the time of an emergency stop of the vehicle.

Other Embodiments

The present invention is not limited to the embodiments described with reference to the above description and drawings. For example, the following embodiments are also included in the technical scope of the present invention.

(1) The secondary battery cell 62 is not limited to a lithium ion secondary battery cell, and may be other non-aqueous electrolyte secondary battery. The secondary battery cells 62 are not limited to be connected in series and in parallel, and may be connected in series or may be formed of a single cell. A capacitor can be used instead of the secondary battery cell 62. Any type of energy storage cell may be used provided that the energy storage cell has a characteristic that includes a plurality of regions having different internal pressures P (a first region and a second region having the internal pressure higher than the internal pressure of the first region). The secondary battery cell and the capacitor are examples of the energy storage cell.

(2) In the above-mentioned embodiments, the shifting from the first region A1 to the second region A2 and the shifting from the second region A2 to the third region A3 are determined based on the "SOC" of the secondary battery cell 62. The shifting of the region may be determined based on other physical quantities provided that these physical quantities correlate with the deterioration of the battery performance. For example, the deterioration of the battery performance may be determined based on the "voltage" of the secondary battery cell 62. Besides the "voltage", the deterioration of the battery performance may be determined based on the "temperature" or the "current" of the secondary battery cell.

(3) In the above-mentioned embodiment, the secondary battery cell 62 has three regions A1 to A3, that is, the first region A1, the second region A2, and the third region A3 in terms of battery performance. It is sufficient that the secondary battery cell 62 has at least the first region A1 and the second region A2 that exhibits the lower battery performance than the first region A1. The secondary battery cell 62 may or may not have the third region A3.

It is sufficient that the second region A2 is a region that exhibits the lower battery performance than the first region A1. Whether or not the deterioration of the battery performance is accelerated is irrelevant to the determination of whether the region is the first region or the second region. That is, in the case of the SOC-P characteristic illustrated in FIG. 6, it is sufficient that the second region A2 is a region that has the high internal pressure P (a region that has a low battery performance) compared to the first region A1. The inclination of the graph may be changed or may not be changed. The same goes for the third region A3.

(4) In the first embodiment, the predetermined time Tw is changed based on the total voltage, the current, and the temperature of the assembled battery 60 at the point of time that the battery performance is shifted to the second region. The predetermined time Tw may be a fixed value. In changing the predetermined time Tw, the predetermined time Tw may be changed based on any one of the total voltage, the current, and the temperature of the assembled battery 60. Alternatively, the predetermined time Tw may be changed based on two factors out of the total voltage, the current, and the temperature of the assembled battery 60.

(5) In the fourth embodiment, when the region A of the assembled battery 60 is shifted from the first region A1 to the second region A2, the management device 130 changes over the connection state of the current interruption device 53 based on whether the vehicle 10 on which the battery 50 is mounted is traveling or not traveling. That is, in the case where the vehicle 10 is traveling, after the shifting of the region A of the assembled battery 60 from the first region A1 to the second region A2, the power supply is maintained for a predetermined time Tw by closing the current interruption device 53. In the case where the vehicle is not traveling, immediately after the shifting of the region A of the assembled battery 62 from the first region A1 to the second region A2, the current interruption device 53 is opened so as to interrupt a current. Not only with respect to the case where the vehicle 10 is traveling, but also with respect to the case where the vehicle is not traveling (stopping, parking or the like), after shifting of the region A of the assembled battery 62 from the first region A1 to the second region A2, the management device 130 may maintain the power supply for the predetermined time Tw by closing the current interruption device 53. Since the supply of electricity is maintained, it is possible to secure electricity for performing a vehicle control that is required when a driver leaves the vehicle 10 such as a window opening and closing control or a door locking control. Accordingly, the safety of the vehicle is enhanced.

(6) In the above-mentioned embodiment, the management device 130 is disposed in the battery 50. It is sufficient that the battery 50 includes at least instruments such as the current detection resistor 54 and the voltage detection circuit 110. The management device 130 and the current interruption device 53 may be disposed outside the device of the battery 50.

(7) In the above-mentioned embodiment, an outer case of the secondary battery cell 62 is formed of a "rectangular parallelepiped case (a metal can or a plastic case) 82". However, the outer case of the secondary battery cell 62 may be a laminate film (a pouch cell).

(8) In the second embodiment, as illustrated in FIG. 14A, when the battery 50 is shifted from the first region A1 to the second region A2, the management device 130 outputs a signal that notifies the shifting of the region A from the battery 50 to the vehicle ECU 140. Then, the management device 130 maintains the power supply by closing the current interruption device 53 until an emergency stop of the vehicle 10, and, after the vehicle 10 is stopped in emergency, the management device 130 prohibits the charging of the battery 50 thus preventing the battery 50 from shifting from the region A2 to the region A3. As illustrated in FIG. 14B, the management device 130 may maintain the power supply by closing the current interruption device 53 until the engine is stopped, and, after the engine is stopped, the management device 130 may prohibit the charging of the battery 50 thus preventing the battery 50 from shifting from the region A2 to the region A3.

The invention claimed is:

1. A control device for an energy storage cell mounted on a vehicle, comprising:
a processor; and
a memory, wherein
the control device monitors a temperature or a current of the energy storage cell that comprises a first battery performance region and a second battery performance region having lower battery performance than the first battery performance region,
the control device, in a case where the energy storage cell is shifted from the first battery performance region to the second battery performance region, outputs a signal notifying shifting of the region, and
the control device controls a current interruption device that is configured to not interrupt the current to/from the energy storage cell if the current interruption device is in a closed state and to interrupt the current if the current interruption device is in an open state,
the control device maintains the current interruption device in the closed state after outputting the signal for a predetermined time associated with the monitored temperature or the current.

2. The control device according to claim 1, wherein
the energy storage cell comprises, in addition to the first battery performance region and the second battery performance region, a third battery performance region where battery performance is further lower than the battery performance in the second battery performance region, and
the control device changes the current interruption device from the closed state to the open state to interrupt the current when the energy storage cell is shifted from the second battery performance region to the third battery performance region after the outputting of the signal.

3. The control device according to claim 1, wherein
the predetermined time is changed based on at least one of a voltage, the current, and the temperature of the energy storage cell monitored by the control device at a time of shifting from the first battery performance region to the second battery performance region.

4. The control device according to claim 1, wherein
the control device prohibits charging of the energy storage cell after the vehicle is stopped or after an engine is stopped.

5. The control device according to claim 1, wherein
the control device permits discharging of electricity from the energy storage cell after the vehicle is stopped regardless of a lapse of the predetermined time.

6. The control device according to claim 1, wherein
in a case where the vehicle on which the energy storage cell is mounted is traveling, the current interruption device is maintained in the closed state for the predetermined time after the energy storage cell is shifted from the first battery performance region to the second battery performance region, and
in a case where the vehicle on which the energy storage cell is mounted is not traveling, the current interruption device is switched from the closed state to the open state at a time when the energy storage cell is shifted from the first battery performance region to the second battery performance region.

7. The control device according to claim 1, wherein
when the energy storage cell is shifted from the first battery performance region to the second battery performance region in a state where the energy storage cell is not mounted on the vehicle, the current interruption device is switched from the closed state to the open state when the energy storage cell is shifted from the first battery performance region to the second battery performance region.

8. An energy storage apparatus for a vehicle, comprising:
an energy storage cell;
a current interruption device configured to interrupt a current to/from the energy storage cell when the current interruption device is in an open state and to not interrupt the current when in a closed state; and
a control device, comprising a processor and a memory, wherein
the control device monitors a temperature or a current of the energy storage cell that comprises a first battery performance region and a second battery performance region having lower battery performance than the first battery performance region,
the control device, in a case where the energy storage cell is shifted from the first battery performance region to the second battery performance region, outputs a signal notifying shifting of the region, and
after outputting of the signal, the control device maintains the current interruption device in the closed state for a predetermined time associated with the monitored temperature or the current.

9. A method of controlling an energy storage cell mounted on a vehicle, the method comprising:
monitoring a temperature or a current of the energy storage cell comprising a first battery performance region and a second battery performance region having lower battery performance than the first battery performance region,
in a case where the energy storage cell is shifted from the first battery performance region to the second battery performance region, outputting a signal notifying shifting of the region; and
after outputting the signal, maintaining a current interruption device that interrupts a current to/from the energy storage cell in a closed state to allow the current to flow to/from the energy storage cell for a predetermined time associated with the monitored temperature or the current.

10. The control device according to claim 1, wherein
the memory stores therein a data table in which the temperature and the predetermined time is associated.

11. The control device according to claim 10, wherein
in the data table, the temperature and a voltage of the energy storage device are associated with the predetermined time.

12. The control device according to claim 10, wherein
in the data table, the temperature and the current of the energy storage device are associated with the predetermined time.

13. The control device according to claim 10, wherein
in the data table, the temperature, a voltage and the current of the energy storage device are associated with the predetermined time.

14. The energy storage apparatus according to claim 8, wherein
the energy storage apparatus is a single 12V-battery.

15. The energy storage apparatus according to claim 8, wherein
the predetermined time is changed based on at least one of a voltage, the current, and the temperature of the energy storage cell monitored by the control device at a time of shifting from the first battery performance region to the second battery performance region.

16. An energy storage apparatus for a vehicle, comprising:
an energy storage cell;
a current interruption device configured to interrupt a current to/from the energy storage cell when in an open state and to not interrupt the current in a closed state; and
a control device, wherein
the energy storage apparatus is a single 12V-battery,
the control device comprises a processor and a memory,
the control device monitors a temperature or a current of the energy storage cell that comprises a first battery performance region and a second battery performance region having lower battery performance than the first battery performance region,
the control device, in a case where the energy storage cell is shifted from the first battery performance region to the second battery performance region, outputs a signal notifying shifting of the region,
after outputting of the signal, the control device maintains the current interruption device in the closed state for a predetermined time associated with the monitored temperature or the current,
the memory stores therein a data table in which the temperature and the predetermined time or the temperature and the predetermined time are associated, and
the predetermined time is changed based on at least one of a voltage, the current, and the temperature of the energy storage cell monitored by the control device at a time of shifting from the first battery performance region to the second battery performance region.

* * * * *